(12) United States Patent
Lee et al.

(10) Patent No.: US 12,465,934 B2
(45) Date of Patent: Nov. 11, 2025

(54) CATHODE MATERIAL INTEGRATED PROCESSING DEVICE

(71) Applicants: DAE SUNG MACHINERY CO., LTD., Siheung-si (KR); ECOPRO BM CO., LTD., Cheongju-si (KR)

(72) Inventors: Sung Min Lee, Suwon-si (KR); Hee Sung Lee, Ansan-si (KR); Chul U Bak, Siheung-si (KR)

(73) Assignees: DAE SUNG MACHINERY CO., LTD., Siheung-si (KR); ECOPRO BM CO., LTD., Cheongju-si (KR)

( * ) Notice: Subject to any disclaimer, the term of this patent is extended or adjusted under 35 U.S.C. 154(b) by 468 days.

(21) Appl. No.: 18/086,814

(22) Filed: Dec. 22, 2022

(65) Prior Publication Data
US 2023/0278052 A1    Sep. 7, 2023

(30) Foreign Application Priority Data
Mar. 4, 2022 (KR) .......................... 10-2022-0027859

(51) Int. Cl.
*B05B 9/00* (2006.01)
*B05B 15/25* (2018.01)
(Continued)

(52) U.S. Cl.
CPC .............. *B05B 9/002* (2013.01); *B05B 15/25* (2018.02); *F26B 3/20* (2013.01); *F26B 9/082* (2013.01);
(Continued)

(58) Field of Classification Search
None
See application file for complete search history.

(56) References Cited

U.S. PATENT DOCUMENTS

| | | | | |
|---|---|---|---|---|
| 2,256,281 A | * | 9/1941 | Finley | E01C 19/105 366/24 |
| 2010/0092652 A1 | * | 4/2010 | Ogura | C05F 9/02 71/14 |

FOREIGN PATENT DOCUMENTS

| | | |
|---|---|---|
| CN | 208567408 | 3/2019 |
| JP | 2002255562 | 9/2002 |

(Continued)

OTHER PUBLICATIONS

EPO, Search Report of EP 22213928.9 dated Aug. 9, 2023.

*Primary Examiner* — Alexander M Weddle
(74) *Attorney, Agent, or Firm* — LEX IP MEISTER, PLLC

(57) ABSTRACT

A cathode material integrated processing device, which dries, applies, and heat-treats a cathode material, according to an embodiment of the invention includes a support frame, a chamber part including a cylindrical body configured to accommodate the cathode material and a thick plate coupled to each of both ends of the cylindrical body to seal both the ends of the cylindrical body and configured to fix the cylindrical body to an upper portion of the support frame, a heating part disposed in each of the outside the cylindrical body and the outside the thick plate of the chamber part to heat the chamber part, a spray part including one or more nozzles, which is disposed between an upper portion and one side of the cylindrical body of the chamber part and is inserted in a longitudinal direction of the cylindrical body to spray a coating liquid to the cathode material within the chamber part through a gas, a stirring part rotatably disposed inside the cylindrical body of the chamber part to stir the cathode material within the chamber part, a driving part connected to one side of the stirring part and rotatably disposed at one side of an upper portion of the support frame
(Continued)

to rotate the stirring part, and a control part configured to control the heating part, the spray part, and the driving part.

10 Claims, 6 Drawing Sheets

(51) Int. Cl.
  *F26B 3/20* (2006.01)
  *F26B 9/08* (2006.01)
  *F26B 25/06* (2006.01)
  *H01M 4/04* (2006.01)
(52) U.S. Cl.
  CPC ........... *F26B 25/06* (2013.01); *H01M 4/0419* (2013.01); *H01M 4/0471* (2013.01)

(56) References Cited

FOREIGN PATENT DOCUMENTS

| | | |
|---|---|---|
| JP | 2006-274201 | 10/2006 |
| JP | 2017131836 | 8/2017 |
| KR | 10-2018-0074430 | 7/2018 |
| KR | 10-2020-0107727 | 9/2020 |
| WO | 2008117342 | 10/2008 |
| WO | 2012176903 | 12/2012 |

\* cited by examiner

[FIG.1]
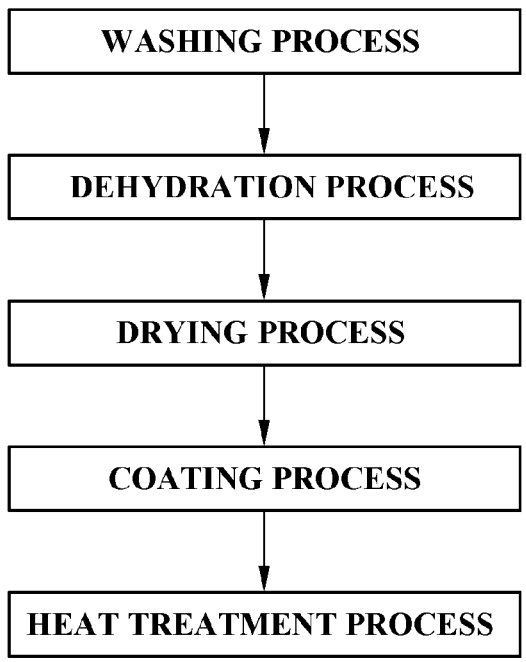

[FIG.2]
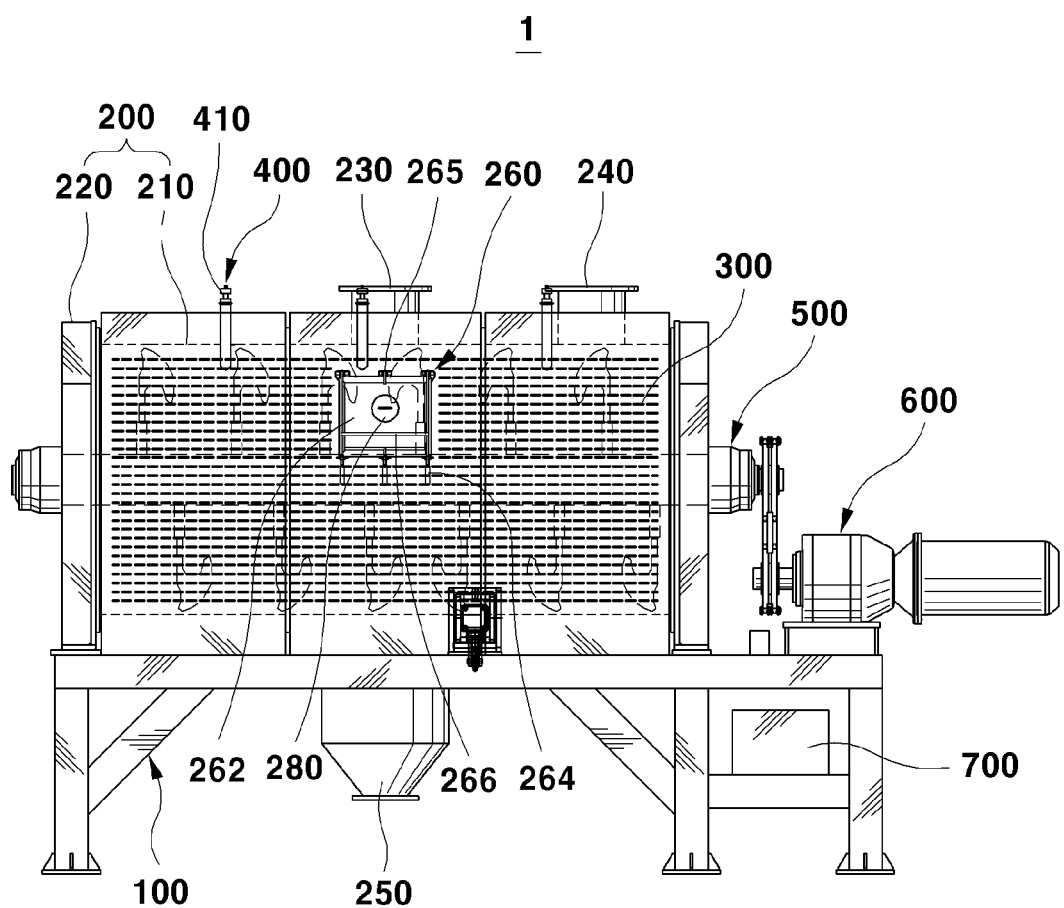

[FIG.3]
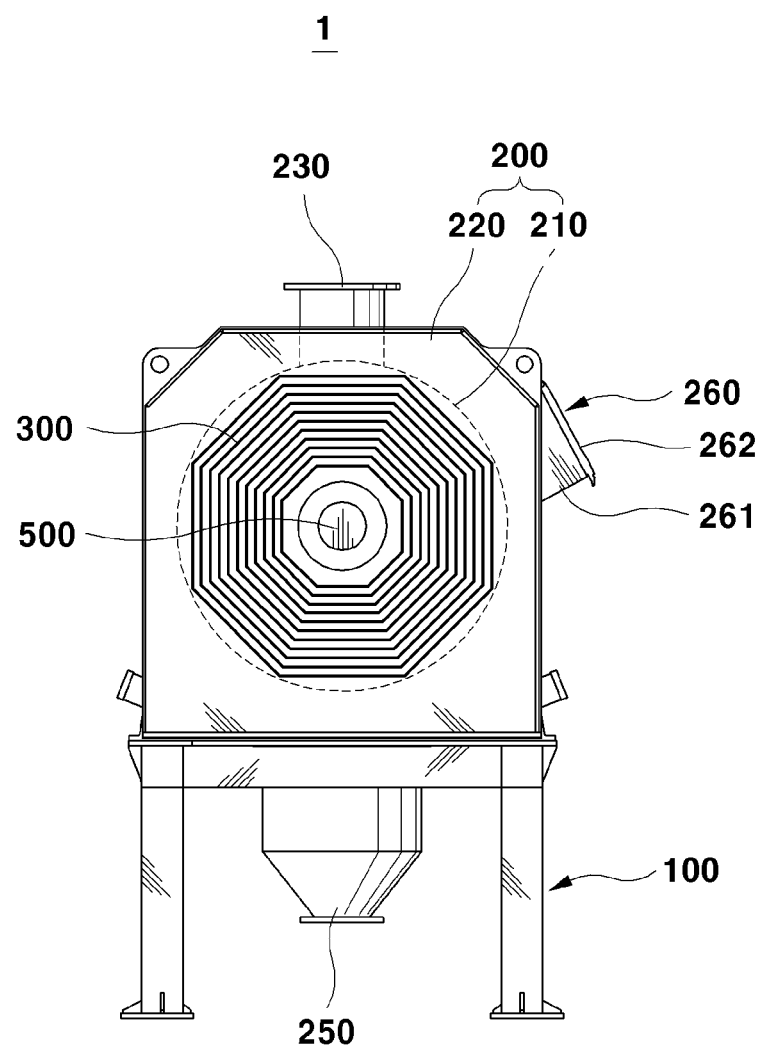

[FIG.4]
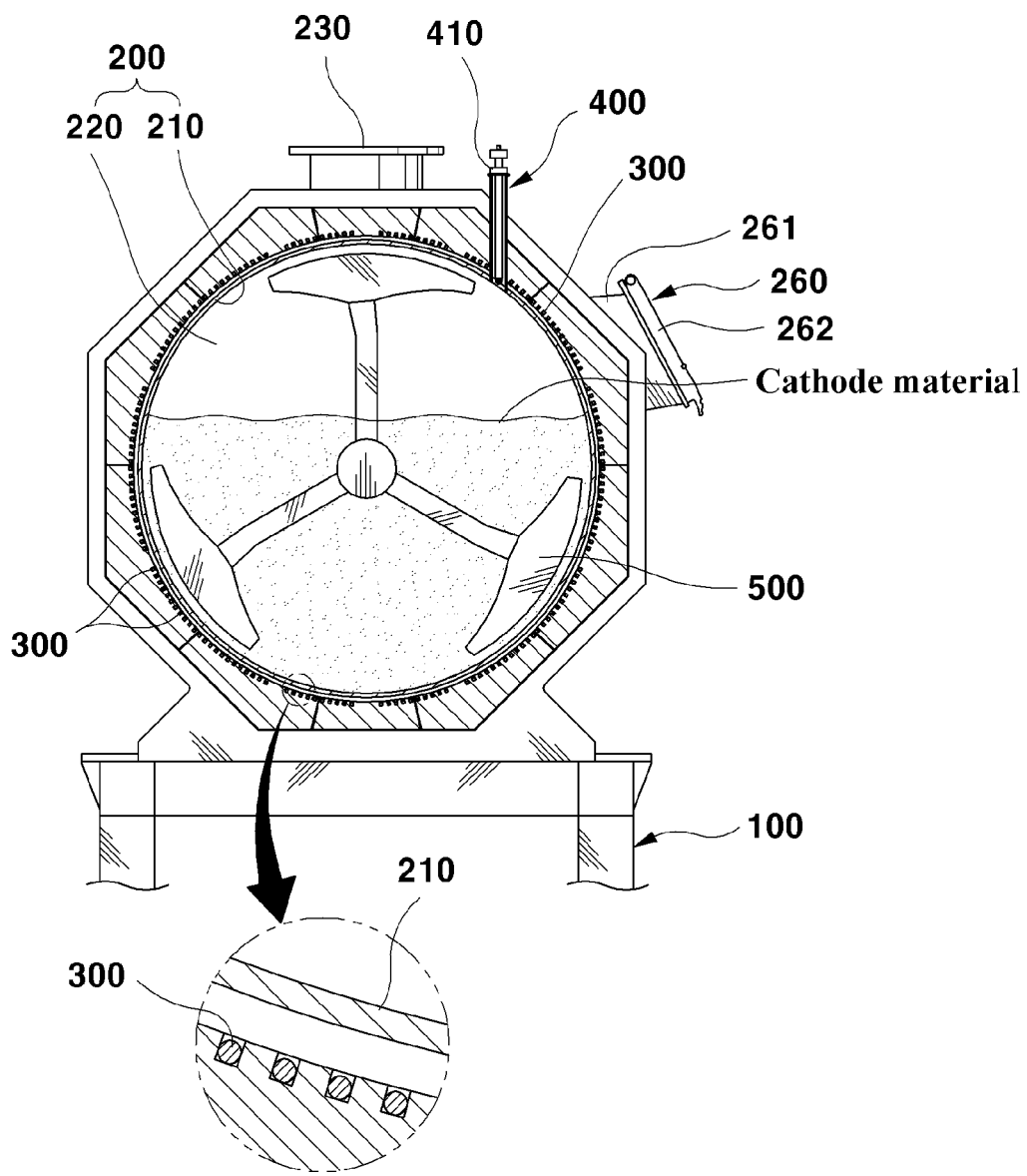

[FIG.5]
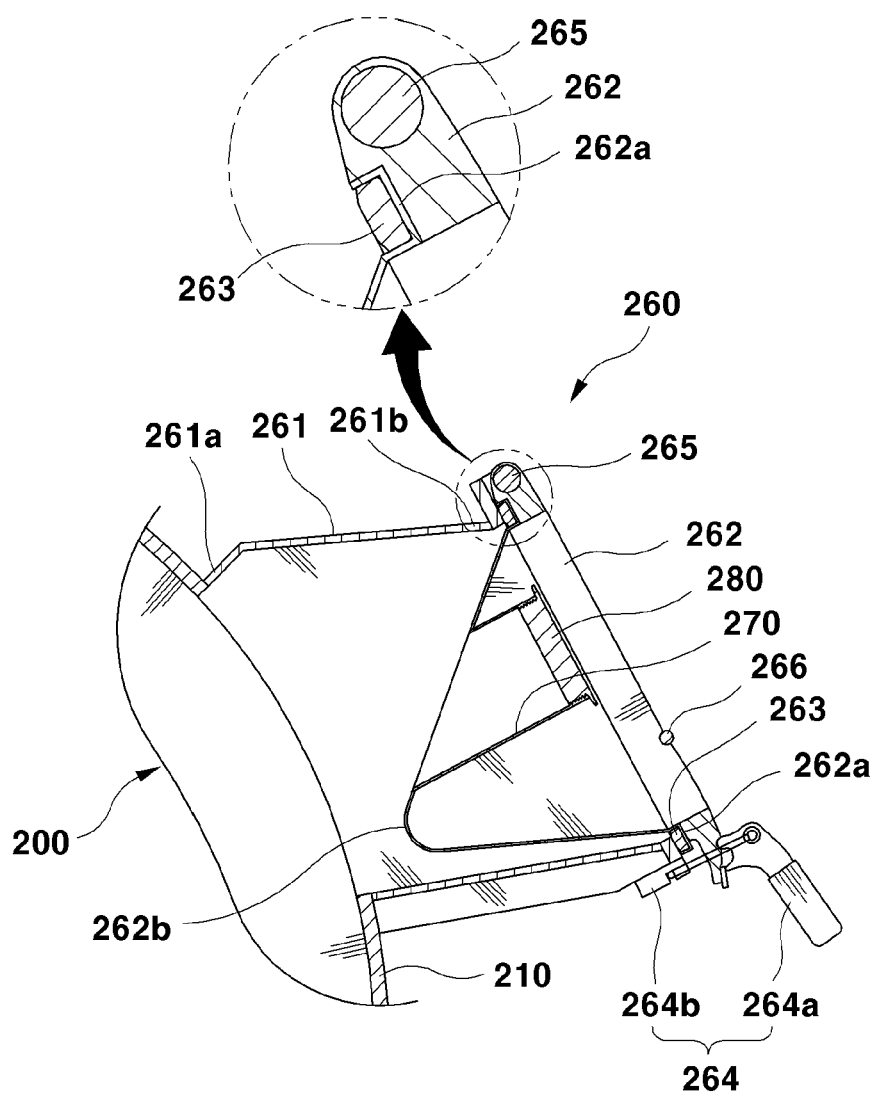

[FIG.6]
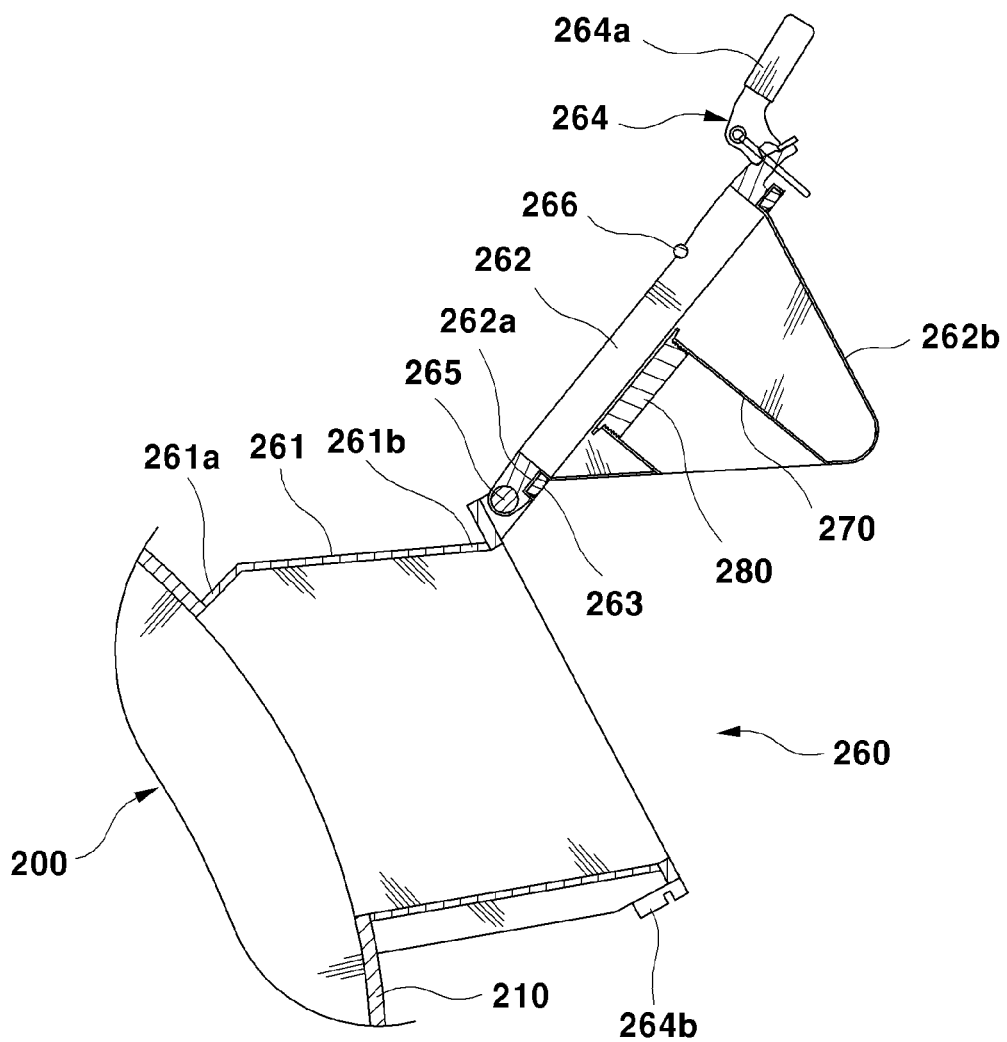

CATHODE MATERIAL INTEGRATED PROCESSING DEVICE

STATEMENT REGARDING GOVERNMENT SUPPORT

This research was supported by Development of Materials Components Technologies through Korea Evaluation Institute of Industrial Technology funded by Ministry of Trade, Industry and Energy. (Project No.: 20016080, Project name: Development of cathode material surface treatment technology and equipment with long-term stability at high temperature)

BACKGROUND OF THE INVENTION

1. Field of the Invention

The present invention relates to a cathode material integrated processing device, and more particularly, to a cathode material integrated processing device, in which processes of drying, applying, heat-treating a cathode material of a secondary battery are unified to maximize work efficiency, quality, and productivity according to manufacturing of the cathode material.

2. Description of the Related Art

In recent years, as mobile devices such as portable game consoles, portable phones (smart phones, etc.), and portable computers (laptop computers, tablet PCs, etc.) are widely distributed and used, demands for secondary batteries that are chargeable and dischargeable as power sources for mobile devices are rapidly increasing.

In addition, in order to be commercially applicable to electric vehicles (EVs), energy storage systems (ESSs), etc., research and development for improving performance and manufacturability of secondary batteries are being actively conducted.

In general, a secondary battery includes a cathode material, an anode material, an electrolyte, and a separator.

Among them, the cathode material is an important factor for determining performance (capacity, output, etc.) of the secondary battery.

Representative examples of the cathode material of the secondary battery include $LiCoO_2$ (LCO), $LiNiCoMnO_2$ (NCM), $LiNiCoAlO_2$ (NCA), $LiFePO_4$ (LFP), and the like.

As illustrated in FIG. 1, the cathode materials have to be subjected to each of washing, dehydration, drying, coating, heat treatment, and cooling processes to prevent quality of the cathode material from being deteriorated and improve intrinsic characteristics of the cathode material.

In addition, in the process of manufacturing the cathode material, a conventional cathode material drying device used in the drying process is disclosed in detail in Korean Patent Registration No. 10-1777977.

The conventional cathode material drying device is constituted by a drying furnace, a stirring device that stirs raw metal powder in the drying furnace, a heating/cooling chamber that is disposed around drying furnace to heat or cool the drying furnace while being isolated from the drying furnace, a steam device that supplies steam or cold air to the heating/cooling chamber, and a bag filter provided at the other side of a cooling device drying furnace to drop down the raw metal powder again into the drying furnace while discharging air and moisture, and thus, the cathode material is dried by heating the drying furnace through the steam supplied from the steam device to a pipe.

However, in the conventional cathode material drying device, since the steam or heat transfer oil is heated and transferred to the drying furnace through the pipe, a heat loss is high, and a temperature control is not easy.

In addition, since the conventional cathode material drying device only dries the cathode material and does not perform the coating and heat treatment processes. As a result, a separate coating and heat treatment device are required to complete the cathode material.

That is, in the conventional cathode material drying device, when adding a heat treatment function, it is not easy to heat the steam or heat transfer oil to a high-temperature heat capable of the heat treatment, and a severe partial temperature deviation occurs in the drying furnace, and thus, it is inappropriate to add the heat treatment function.

In addition, in the conventional cathode material drying device, since the cathode material has to be transferred to the coating and heat treatment devices after drying the cathode material, it takes a lot of time during the transfer process, and impurities may be mixed in the cathode material.

In addition, since the conventional cathode material drying device has a complicated structure due to the installation of pipes and a boiler, the structure is complex, and there are many difficulties in maintenance. The heat transfer oil used in the conventional cathode material drying device has a risk of explosion due to oil vapor and acts as a factor that causes environmental pollution.

Considering the above limitations, in the manufacturing of the cathode material according to the related art, it is difficult to improve work efficiency and quality and increase in productivity and safety.

[Prior Art Document]

[Patent Document]

(Patent Document 1) Korean Patent Registration No. 10-1777977

SUMMARY OF THE INVENTION

The invention is intended to provide a cathode material integrated processing device, which is capable of providing high-temperature heat, has no temperature deviation and heat loss, and is capable of easily controlling a temperature to not only dry a cathode material and but also perform coating and heat treatment, thereby improving work efficiency, quality, and productivity according to manufacturing of the cathode material.

The invention is also intended to provide a cathode material integrated processing device in which an explosive element is removed in advance to improve safety.

The invention is also intended to provide an eco-friendly cathode material integrated processing device which is capable of drying and heat-treating a cathode material without using heat transfer oil that causes environmental pollution.

According to an embodiment of the invention, there is provided a cathode material integrated processing device including: a support frame; a chamber part including a cylindrical body configured to accommodate the cathode material and a thick plate coupled to each of both ends of the cylindrical body to seal both the ends of the cylindrical body and configured to fix the cylindrical body to an upper portion of the support frame; a heating part disposed in each of the outside the cylindrical body and the outside the thick plate of the chamber part to heat the chamber part; a spray part including one or more nozzles, which is disposed between an upper portion and one side of the cylindrical body of the chamber part and is inserted in the cylindrical body to spray a coating liquid to the cathode material within the chamber part through a gas; a stirring part rotatably disposed inside the cylindrical body of the chamber part to stir the cathode material within the chamber part; a driving part connected to one side of the stirring part and rotatably disposed at one side of an upper portion of the support frame to rotate the stirring part; and a control part configured to control the heating part, the spray part, and the driving part.

According to one aspect, the chamber part may further includes: an input part disposed on an upper portion of one side of the cylindrical body to input the cathode material into the chamber part; an exhaust part disposed on an upper portion of the other side of the cylindrical body to discharge moisture within the chamber part to the outside; a discharge part disposed on a lower portion of the cylindrical body to discharge the cathode material to the outside of the chamber part; and a manhole part disposed at one side of the cylindrical body to be accessible for maintenance and cleaning inside the chamber part.

According to one aspect, the heating part may include an electric heating wire.

According to one aspect, the heating part may be spaced apart from the outside of the cylindrical body.

According to one aspect, the manhole part includes: a manhole passage having one end connected to one side of the cylindrical body of the chamber part and the other end protruding out of the cylindrical body so as to be spaced apart from the chamber part; a manhole cover having an upper portion coupled to an upper portion of the other end of the manhole passage through a hinge unit to rotate vertically, thereby opening and closing the manhole passage; a packing inserted into an inner circumference of the manhole cover to seal a gap between the manhole passage and the manhole cover; and a locking unit provided to correspond to each of a lower portion of the other end of the manhole passage and a lower portion of the manhole cover so as to lock the manhole cover configured to open and close the manhole passage.

According to one aspect, the locking unit may include: a latch provided to be rotatably upward on the lower portion of the other end of the manhole passage; and a hook part fixed to the lower end of the manhole cover so that the latch is hooked.

According to one aspect, the cathode material integrated processing device may further include an accommodation groove bent inward to accommodate the packing in the inner circumference of the manhole cover.

According to one aspect, the cathode material integrated processing device may further include a block inserted into the manhole passage to block accumulation of the cathode material inside the manhole passage inside the manhole cover.

According to one aspect, the cathode material integrated processing device may further include a handle configured to hold the manhole cover so as to be fixed on the outside of the manhole cover.

According to one aspect, the cathode material integrated processing device may further include, in the manhole part, an inspection hole passing through the manhole cover to measure an internal temperature of the chamber part; and a plug coupled to the inspection hole so as to be opened and closed.

According to one aspect, a cooling unit configured to cool the manhole part may be disposed in an outer circumferential surface of the manhole passage.

According to one aspect, the manhole passage may have a length of about 200 mm to about 600 mm.

BRIEF DESCRIPTION OF THE DRAWINGS

FIG. 1 is a view illustrating a process of manufacturing a cathode martial according to a related art.

FIG. 2 is a front view illustrating of a cathode material integrated processing device according to an embodiment of the invention.

FIG. 3 is a side view illustrating the cathode material integrated processing device according to an embodiment of the invention.

FIG. 4 is a side cross-sectional view illustrating the cathode material integrated processing device according to an embodiment of the invention.

FIGS. 5 and 6 are views illustrating a manhole part in the cathode material integrated processing device according to an embodiment of the invention.

DETAILED DESCRIPTION OF THE EXEMPLARY EMBODIMENTS

Hereinafter, embodiments of the cathode material integrated processing device according to the invention will be described in more detail based on the accompanying drawings.

Here, components having the same function in all the drawings below use the same reference numerals, and repetitive descriptions are omitted. Furthermore, the terms to be described later are defined in consideration of the functions in the invention, which are unique and commonly used. should be interpreted in meaning. In addition, in the following description of the invention, if it is determined that a detailed description of the related known function or configuration may unnecessarily obscure the subject substance of the invention, the detailed description thereof will be omitted. Furthermore, when it is described that one includes some elements, it should be understood that it may include only those elements, or it may include other elements as well as those elements if there is no specific limitation.

FIG. 1 is a view illustrating a process of manufacturing a cathode martial according to a related art.

FIG. 2 is a front view illustrating of a cathode material integrated processing device according to an embodiment of the invention, FIG. 3 is a side view illustrating the cathode material integrated processing device according to an embodiment of the invention, FIG. 4 is a side cross-sectional view illustrating the cathode material integrated processing device according to an embodiment of the invention, and FIGS. 5 and 6 are views illustrating a manhole part in the cathode material integrated processing device according to an embodiment of the invention.

As illustrated in the drawings, a cathode material integrated processing apparatus 1 according to an embodiment of the invention includes a support frame 100, a chamber part 200, a heating part 300, a spray part 400, a stirring part 500, the driving part 600, and the control part 700.

The support frame 100 is provided to be disposed below the chamber part 200.

The chamber part 200 includes a cylindrical body 210 for accommodating a cathode material in an upper portion of the support frame 100 and a thick plate 220 coupled to each of both ends of the cylindrical body 210 to seal both the ends of the cylindrical body 210 and configured to fix the cylindrical body 210 to an upper portion of the support frame 100.

The heating part 300 is configured to heat the chamber part 200 outside the cylindrical body 210 and the thick plate 220 of the chamber part 200.

The heating part 300 is provided as an electric heating wire heated by electricity, and the heating part is spaced apart from the outside of the cylindrical body.

The spray part 400 includes one or more nozzles 410 disposed between the upper portion and one side of the cylindrical body 210 of the chamber part 200 and inserted in a longitudinal direction of the cylindrical body 210 to spray a coating liquid to the cathode material within the chamber part 200 through a gas.

Although the spray part 400 is not shown in the drawings, the nozzle 410 is connected to a coating liquid supply part for supplying a coating liquid and a gas supply part for supplying a gas.

The stirring part 500 is disposed inside the cylindrical body 210 of the chamber part 200 to rotate and stir the cathode material inside the chamber part 200.

The stirring part 500 includes a stirring rotation shaft inserted into the cylindrical body 210 and having one end and the other end, which are rotatably supported inside the thick plate 220, one or more connection rods having one end fixed to a circumference of the stirring rotation shaft to protruding radially, and a blade fixed to the other end of the connection rod to stir the cathode material.

The driving part 600 is connected to one side of the stirring part 500 and rotatably disposed at one side of the upper portion of the support frame 100 to rotate the stirring part 500.

The driving part 600 may include a motor fixed to the upper portion of the support frame 100, a reducer connected to the motor, a sprocket connected to the reducer, a sprocket fixed to one end of the stirring rotation shaft, and a chain connecting the sprocket.

The control part 700 is disposed on the support frame 100 to control the heating part 300, the spray part 400, and the driving part 600.

Although the control part 700 is installed on the support frame 100 as an embodiment, the control part 700 may be installed anywhere as long as the control part 700 controls the heating part 300, the spray part 400, and the driving part 600.

In addition, in the chamber part 200, an input part 230 for inputting the cathode material into the chamber part 200 is disposed on an upper portion of one side of the cylindrical body 210.

Although not shown in the drawings, the input part 230 is connected to a cathode material supply part that supplies the cleaned cathode material to the chamber part 200.

An exhaust part 240 for discharging moisture within the chamber part 200 to the outside is disposed on an upper portion of the other side of the cylindrical body 210.

Although not shown in the drawings, the exhaust part 240 is connected to a filter and a moisture emitter.

A discharge part 250 for discharging the cathode material to the outside of the chamber part 200 is disposed on a lower portion of the cylindrical body 210.

A manhole part 260 that is accessible for maintenance and cleaning inside the chamber part 200 is disposed at one side of the cylindrical body 210.

The manhole part 260 is constituted by roughly a manhole passage 261, a manhole cover 262, a packing 263, and a locking unit 264.

The manhole passage 261 has one end 261*a* connected to one side of the cylindrical body 210 of the chamber part 200 and the other end 261*b* protruding out of the cylindrical body 210 so as to be spaced apart from the chamber part 200.

A cooling unit for cooling the heat transferred to the manhole cover 262 and the packing 263 may be disposed on an outer surface of the manhole passage 261.

An upper portion of the manhole cover 262 is coupled to an upper portion of the other end 261*b* of the manhole passage 261 through a hinge unit 265 to open the manhole passage 261 while rotating vertically.

The packing 263 is inserted into an inner circumference of the manhole cover 262 to seal a gap between the manhole passage 261 and the manhole cover 262.

The locking unit 264 corresponds to a lower portion of the other end 261*b* of the manhole passage 261 and a lower portion of the manhole cover 262 to lock the manhole cover 262 that closes the manhole passage 261.

The locking unit 264 may include a latch part 264*a* disposed to be rotatable vertically on the lower portion of the other end 261*b* of the manhole passage 261 and a hook part 264*b* fixed to a lower end of the manhole cover 262 so that the latch part 264*a* is hooked.

An accommodation groove 262*a* bent inward to accommodate the packing 263 is defined in an inner circumference of the manhole cover 262.

A block 262*b* inserted into the manhole passage 261 to block accumulation of the cathode material inside the manhole passage 261 is disposed inside the manhole cover 262.

A lower portion of the block 262*b* is provided to block the inside of the manhole passage 261, and the upper portion of the block 262*b* is inclined downward so that the cathode material flows down into the chamber part 200.

A handle 266 for holding the manhole cover 262 is disposed to be fixed on the outside of the manhole cover 262 in a round bar shape.

In the manhole part 260, an inspection hole 270 passing through the block 262*b* of the manhole cover 262 to communicate with the inside of the chamber part 200 so as to measure an internal temperature of the chamber part 200 is defined in the block 262*b* of the manhole cover 262, and a plug 280 is coupled to the inspection hole 270 so as to be opened and closed.

An operation of the cathode material integrated processing device according to an embodiment of the invention, which is configured as described above, will be described.

As illustrated in FIGS. 2 to 4, when the cathode material within the chamber part 200 is stirred using the stirring part 500 while the cleaned cathode material is put into the chamber part 200 through an input part 230 and is heated so that the chamber 200 has an internal temperature of about 100° C. to about 180° C. through the heating part 300, the cathode material is dried.

In addition, when the drying of the cathode material is completed, while the stirring part 500 stirs the cathode material, the spray part 400 sprays the coating liquid to the cathode material through the nozzle 410, and heat treatment is performed to apply the cathode material.

The heat treatment is performed while the chamber part 200 is heated at a high-temperature heat so that the chamber has an internal temperature of about 300° C. to about 600° C.

Thereafter, when the applying of the cathode material is completed, the cathode material is cooled and then discharged through the discharge part 250 to the outside, thereby completing the manufacturing of the cathode material.

That is, as the heating part 300 is provided as the electric heating wire 310 to directly heat the chamber part 200, there is no temperature deviation and heat loss inside the chamber part 200, and high-temperature heat at which the heat treatment is capable of being performed may be provided inside the chamber part 200.

Although the spray part 400 is not shown in the drawings, the nozzle 410 may be connected to each of a coating liquid supply part and a gas supply part, and thus, the nozzle 410 may spray the coating liquid to the cathode material inside the chamber part 200 through a gas so that the cathode material is coated with the coating liquid.

The stirring part 500 stirs and homogenizes the cathode material inside the chamber part 200 through the driving part 600 to efficiently perform drying, coating, and heat treatment processes of the cathode material through the stirring part 500.

In addition, as illustrated in FIG. 4, the heating part 300 may be disposed to be spaced apart from the outside of the cylindrical body 210 of the chamber part 200 to prevent the heating part 300 from being damaged due to thermal expansion of the chamber part 200.

The spaced distance of the heating part 300 may be within a range in which a heat transfer rate of the heating part 300 is not greatly reduced and within a level considering the thermal expansion of the chamber part 200. Since the heat transfer by convection current is reduced, a maximum temperature inside the chamber part may be lowered. Therefore, the spaced distance may be about 15 mm or less.

In addition, the manhole part 260 is locked and closed by the locking part 264 when processing the cathode material inside the chamber part, and the locking unit 264 is unlocked to be opened only when the inside of the chamber part 200 is inspected or cleaned so that the worker or the machine is accessible from/into the chamber part 200 through the manhole part 260.

FIG. 5 illustrates a state in which the manhole part 260 is closed, and the manhole cover 262 is locked at an entrance of the manhole passage 261 by the latch that is the locking unit 264, and the hook part 264*b*.

One or more locking unit 264 may be installed in consideration of a size of the manhole cover 262 and an internal pressure of the chamber part 200.

In addition, referring to FIG. 5, it is seen that the manhole passage 261 has one end 261*a* connected to one side of the cylindrical body 210 of the chamber 200 and the other end 261*b*, at which the manhole cover 262 and the packing 263 are disposed, to extend to the outside of the cylindrical body 210 so as to be spaced apart from the chamber part 200.

The reason is that high-temperature heat is generated in the chamber part 200 during the drying or heat treatment of the cathode material. Here, the high-temperature heat of the chamber part may be prevented from being in direct contact with the manhole cover 262 and the packing 263 to prevent the manhole cover 262 from being deformed by the high-temperature heat, and also, to prevent the packing, which seals the gap between the manhole passage 216 and the manhole cover 262, from being thermally cured by the high-temperature heat of the chamber part 200. As described above, the manhole passage 261 may have a long heat transfer path to reduce an amount of heat transferred to the manhole cover 262 and the packing 263. Here, to reduce the amount of heat, the manhole passage 261 may has a length of about 200 mm or more.

If the length of the manhole passage 261 is too long, it may not be suitable for the internal inspection or cleaning, which is the original role of the manhole part 260, and thus, the manhole passage 261 may have a length of about 600 mm or less. Therefore, the length of the manhole passage 261 may be in the range of about 200 mm to about 600 mm, more preferably in the range of about 300 mm to about 500 mm. That is, if the thermal curing of the packing 263 is left unattended, airtightness of the packing 263 is reduced, and as high-temperature heat and moisture leak into the chamber 200 between the manhole passage 261 and the manhole cover 262, resulting in causing defects during the processing of the cathode material and causing safety accidents due to explosion of the chamber part 200. Thus, the thermal curing of the packing 263 has to be prevented from occurring.

An outer surface of the manhole passage 261 may further include a cooling unit for cooling the heat transmitted through the manhole passage. The cooling unit may be a water-cooling type cooling passage through which cooling water flows. The heat transferred to the manhole cover 262 and the packing 263 may be effectively blocked through this cooling unit.

Table 1 below shows temperature measurement results in the packing according to the length of the manhole passage and the presence or absence of the cooling unit during the operation of the device.

TABLE 1

| | Manhole passage length (mm) | Cooling unit | Minimum temperature (° C.) | Maximum temperature (° C.) | Mean temperature (° C.) |
|---|---|---|---|---|---|
| Comparative Example 1 | 100 | Absence | 290.57 | 334.26 | 318.74 |
| Embodiment 1 | 300 | Absence | 174.86 | 235.88 | 212.05 |
| Embodiment 2 | 500 | Absence | 155.02 | 215.34 | 193.11 |
| Embodiment 3 | 300 | Cooling water circulation device | 61.43 | 80.8 | 68.9 |

As can be seen in Table 1, if the length of the manhole passage is too short, a temperature that the packing withstand the high-temperature heat exceeds about 300° C. to cause damage of the packing. However, when the manhole passage is above a certain level, the temperature in the packing is stably maintained below 250° C. to prevent packing from being damaged or prevent the manhole cover from being deformed.

Particularly, when the cooling unit such as a chiller is placed on the outer surface of the manhole passage, the heat transmitted to the packing and manhole cover may be effectively blocked.

In addition, the accommodation groove 262*a* defined in the inner circumference of the manhole cover 262 may support the packing 263 so as not to be expand to the outside, thereby preventing the packing 263 from thermally expansion.

FIG. 6 is a state in which the manhole part 260 is opened. When the latch 264*a* and the hook part 264*b* of the locking unit 264 are separated from each other to release the locking, and then, the worker holds the handle 266 to lift the manhole cover 262, the manhole cover 262 rotates upward through the hinge unit 265 to open the manhole passage 261.

Therefore, as the worker or machine is capable of being accessible inside of the chamber part 200 through the opened manhole passage 261, it is easy and convenient to inspect or clean the inside of the chamber part 200.

In addition, as the inspection hole 270 and the plug 280 are provided on the manhole part 260, the internal temperature of the chamber part 200 may be measured through the inspection hole 270 without opening the manhole part 260, or the state of the cathode material being processed may be grasped.

To couple the inspection hole 270 to the plug 280, a screw thread disposed on an inner circumference of the inspection hole 270 and a screw thread disposed on an outer circumference of the plug 280 may be engaged with each other to be coupled.

Due to the above-described configuration, the cathode material integrated processing device according to the invention may perform the drying, coating, and heat treatment processes through one device to improve the work efficiency, the quality, and the productivity according to the manufacturing of the cathode material.

That is, as the heating part is provided as the electric heating wire to provide the high-temperature heat to the inside of the chamber part, the present invention may effectively perform not only the drying process of the cathode material, but also the heat treatment process of the cathode material, and as the spray part sprays the coating liquid onto the cathode material inside the chamber part through the gas, the present invention may effectively perform the coating process of the cathode material, and the present invention may homogenize the cathode material during the drying, the coating, and the heat treatment of the cathode material through the stirring part.

In addition, since the conventional heat transfer oil is replaced with the electric heating wire in the heating part, the explosion accident due to the oil vapor may be prevented in advance, and the environmental pollution may not occur.

In addition, as the worker or machine may be accessible the inside of the chamber part through the manhole part, it is convenient when inspecting or cleaning the inside of the chamber part.

In addition, as the manhole cover of the manhole part and the packing sealing the manhole cover are spaced apart from the high-temperature chamber part through the manhole passage that extends in length, the thermal curing of the packing due to the high-temperature heat of the chamber part and the deformation of the manhole cover may be minimized.

In addition, as the inspection hole and the plug are provided in the manhole part, the internal temperature of the chamber part may be measured, or the state of the cathode material may be grasped through the inspection hole without opening the manhole part.

In addition, since the structure is simple, the installation and disassembly may be easy, and the time and cost associated with the maintenance may be saved.

What is claimed is:

1. A cathode material integrated processing device, which dries, applies, and heat-treats a cathode material, the cathode material integrated processing device comprising:
    a support frame;
    a chamber part including a cylindrical body configured to accommodate the cathode material and a pair of plates respectively coupled to both ends of the cylindrical body to seal both the ends of the cylindrical body and configured to fix the cylindrical body to an upper portion of the support frame;
    a plurality of heating parts respectively disposed outside the cylindrical body and outside each of the plates of the chamber part to heat the chamber part;
    a spray part including one or more nozzles, which is disposed between an upper portion and one side of the cylindrical body of the chamber part and is inserted in the cylindrical body to spray a coating liquid to the cathode material within the chamber part through a gas;
    a stirring part rotatably disposed inside the cylindrical body of the chamber part to stir the cathode material within the chamber part;
    a driving part connected to one side of the stirring part and rotatably disposed at one side of an upper portion of the support frame to rotate the stirring part; and
    a controller configured to control the heating part, the spray part, and the driving part,
    wherein the chamber part comprises:
        an input part disposed on an upper portion of one side of the cylindrical body to input the cathode material into the chamber part;
        an exhaust part disposed on an upper portion of another side of the cylindrical body to discharge moisture within the chamber part to the outside;
        a discharge part disposed on a lower portion of the cylindrical body to discharge the cathode material to the outside of the chamber part; and
        a manhole part disposed at one side of the cylindrical body to be accessible for maintenance and cleaning inside the chamber part,
    wherein the manhole part comprises:
        a manhole passage having one end connected to one side of the cylindrical body of the chamber part and the other end protruding out of the cylindrical body so as to be spaced apart from the chamber part;
        a manhole cover having an upper portion coupled to an upper portion of the other end of the manhole passage through a hinge unit to rotate vertically, thereby opening and closing the manhole passage;
        a packing inserted into an inner circumference of the manhole cover to seal a gap between the manhole passage and the manhole cover; and
        a locking unit provided to correspond to each of a lower portion of the other end of the manhole passage and a lower portion of the manhole cover so as to lock the manhole cover configured to open and close the manhole passage.

2. The cathode material integrated processing device according to claim 1, wherein the heating part comprises an electric heating wire.

3. The cathode material integrated processing device according to claim 1, wherein the heating part is spaced apart from the outside of the cylindrical body.

4. The cathode material integrated processing device according to claim 1, wherein the locking unit comprises:
    a latch provided to be rotatably upward on the lower portion of the other end of the manhole passage; and
    a hook part fixed to the lower end of the manhole cover so that the latch is hooked.

5. The cathode material integrated processing device according to claim 1, further comprising an accommodation groove bent inward to accommodate the packing in the inner circumference of the manhole cover.

6. The cathode material integrated processing device according to claim 1, further comprising a block inserted into the manhole passage to block accumulation of the cathode material inside the manhole passage inside the manhole cover.

7. The cathode material integrated processing device according to claim 1, further comprising a handle configured to hold the manhole cover so as to be fixed on the outside of the manhole cover.

8. The cathode material integrated processing device according to claim 1, further comprising, in the manhole part;
   an inspection hole passing through the manhole cover to measure an internal temperature of the chamber part; and
   a plug coupled to the inspection hole so as to be opened and closed.

9. The cathode material integrated processing device according to claim 1, wherein a cooling unit configured to cool the manhole part is disposed in an outer circumferential surface of the manhole passage.

10. The cathode material integrated processing device according to claim 1, wherein the manhole passage has a length of about 200 mm to about 600 mm.

* * * * *